United States Patent Office 3,654,184
Patented Apr. 4, 1972

3,654,184
REFORMING CATALYST AND METHOD
OF MANUFACTURE
Kenneth R. McCallister and Thomas P. O'Neal, Shreveport, La., assignors to Universal Oil Products Company, Des Plaines, Ill.
No Drawing. Filed Feb. 2, 1970, Ser. No. 7,972
Int. Cl. B01j 11/78
U.S. Cl. 252—442    9 Claims

ABSTRACT OF THE DISCLOSURE

A catalyst composition comprising combined halogen, a platinum group metal and germanium oxide composited with alumina. The catalyst composition is characterized by a method of preparation whereby an impregnating solution is prepared by dissolving germanium dioxide in water at a temperature of at least about 160° F. and a soluble platinum group metal compound added thereto. The catalyst composition is particularly useful in the reforming of gasoline fractions to improve the anti-knock characteristics thereof.

---

The term "reforming" is well-known in the petroleum industry and refers to the treatment of gasoline fractions to improve the anti-knock characteristics thereof as a motor fuel. The gasoline fraction may be a full boiling range gasoline fraction boiling generally in the 75°–430° F. range, or a selected fraction thereof boiling in the upper 150°–430° F. range, commonly referred to as naphtha.

The gasoline fractions generally subjected to reforming operations comprise naphthenic hydrocarbons, particularly cyclohexane compounds, and paraffinic hydrocarbons which usually are of straight chain or slightly branched chain configuration, as well as varying proportions of aromatic hydrocarbons. The reforming process comprises four principal hydrocarbon conversion reactions. Thus, the naphthenic hydrocarbons are aromatized to aromatic hydrocarbons, aliphatic hydrocarbons of substantially straight chain or slightly branched chain configuration are dehydrocyclicized to aromatic hydrocarbons and/or isomerized to more highly branched chain isomers of said aliphatic hydrocarbons, and larger paraffinic hydrocarbon molecules are hydrocracked to form smaller molecules therefrom, all of said reactions occurring substantially simultaneously in the reforming process. The combined effect of these reactions is the production of high-octane material from low-octane material, and therefore all combine to produce a more desirable motor fuel.

Catalyst compositions comprising a platinum group metal composited with alumina are well established in the art. Platinum composited with alumina has been shown to be particularly effective as a dual-function catalyst in the reforming of gasoline fractions and a variety of modifications and improvements have been proposed.

It is an object of this invention to provide a modified and improved catalyst composition comprising a platinum group metal composited with alumina, said composition being particularly advantageous with respect to the reforming of gasoline fractions to produce motor fuels of improved anti-knock characteristics.

In one of its broad aspects, the present invention embodies a catalyst composition comprising combined halogen, a platinum group metal and germanium oxide composited with alumina. The catalyst composition is characterized by its method of preparation which comprises combining halogen with an alumina gel carrier material; preparing germanium dioxide in aqueous solution at a temperature of at least about 160° F.; commingling a soluble platinum group metal compound with said solution; impregnating the aforesaid alumina gel with the resulting solution; treating the impregnated alumina gel in an oxidizing atmosphere at a temperature at from about 800° to about 1100° F., and thereafter in a reducing atmosphere at conditions effecting reduction of the platinum group metal component, said conditions including a temperature of from about 700° to about 1100° F. whereby the germanium dioxide component is retained as the oxide.

Other objects and embodiments of this invention will become apparent in the following detailed specification.

Considering first the alumina component of the catalyst composition, it will be appreciated that, although other factors are involved including the temperature at which the final catalyst composition is calcined in an oxidizing and/or reducing atmosphere, the physical properties of the alumina carrier material initially employed have a substantial if not determinative influence on the physical properties of the final catalyst composition. Thus, it is preferred to employ a porous, adsorptive, high surface area material characterized by a surface area of from about 150 to about 500 square meters per gram. Suitable aluminas thus include gamma-alumina, eta-alumina, and theta-alumina, the first mentioned gamma-alumina being preferred. A particularly preferred alumina is gamma-alumina characterized by an average bulk density of from about 0.30 to about 0.70 grams per cubic centimeter, an average pore diameter of from about 20 to about 300 angstroms, an average pore volume of from about 0.10 to about 1.0 cubic centimeters per gram, and a surface area of from about 150 to about 500 square meters per gram.

The alumina employed may be a naturally occurring alumina or it may be synthetically prepared in any conventional or otherwise convenient manner. The alumina is typically employed in a shape or form determinative of the shape or form of the final catalyst composition, e.g., spheres, pills, granules, extrudates, powder, etc. A particularly preferred form of alumina is the sphere. One preferred method of preparation which affords a convenient means of developing the desired physical characteristics is substantially in accordance with the oil-drop method described in U.S. Pat. 2,620,314. Thus, an alumina sol, preferably an aluminum chloride sol such as is prepared by digesting aluminum pellets in hydrochloric acid, is dispersed as droplets in a hot oil bath whereby gellation occurs with the formation of spheroidal gel particles. In this type of operation, the alumina is set chemically utilizing ammonia as a neutralizing or setting agent. Usually the ammonia is furnished by an ammonia precursor which is included in the sol. The ammonia precursor is most often urea, hexamethylenetetramine or mixtures thereof, although other weakly basic materials which are substantially stable at normal temperatures but hydrolyzable to ammonia with increasing temperature may be employed. Only a fraction of the ammonia precursor is hydrolyzed or decomposed in the relatively short period during which the initial gellation occurs. During the subsequent aging process, the residual precursor retained in the spheroidal gel particles continues to hydrolyze and effect further polymerization of the alumina whereby the pore characteristics of the material are established. The alumina particles are aged, usually for a period of from about 10 to about 24 hours, at a predetermined temperature, usually from about 120 to 220° F., and at a predetermined pH value. The aging time may be substantially reduced utilizing pressure aging techniques.

As previously stated, the foregoing method affords a convenient means of developing the desired physical characteristics of the carrier material. The method includes a number of process variables which effect the physical properties of the alumina and the catalyst subsequently prepared therefrom. Generally, the aluminum/chloride mole ratio of the alumina sol will influence the apparent bulk density of the alumina product and, correspondingly, the pore volume and pore diameter characteristics attendant therewith, lower ratios tending toward higher apparent bulk densities. Other process variables effecting the physical properties of the catalyst include the time, temperature and pH at which the alumina particles are aged. Usually temperatures in the lower range and the shorter aging periods tend toward higher apparent bulk densities. Surface area properties are normally a function of calcination temperature, a temperature of from about 800° F. to about 1500° F. being suitably employed.

The halogen component of the catalyst composition is considered to exist within the catalyst composition in a combined form, e.g., as a chloride, whereby a desired degree of acidity is imparted to the finished catalyst composition to influence the reforming reaction. The combined halogen may be fluorine, chlorine, iodine, bromine, or combinations thereof. Of these, fluorine, and particularly chlorine, are preferred for the purposes of the present invention. Although the addition of fluorine or chlorine may be effected in any suitable manner, such as by treating the calcined alumina with hydrochloric acid, hydrofluoric acid, etc., a convenient method is in the utilization of the aforementioned aluminum chloride sol formed by digesting aluminum in aqueous hydrochloric acid and/or aluminum chloride, or other halogen equivalent. Where necessary, the alumina may be further treated with an appropriate halogen acid to add additional halogen, or treated with steam to lower the halogen concentration. Also, a halogen component, or a portion thereof, may be included in the catalyst composition incidental to the incorporation of a platinum group metal, for example, through utilization of an aqueous chloroplatinic acid impregnating solution. In any event, the halogen component of the final catalyst composition comprises from about 0.1 to about 1.5 wt. percent, and preferably from about 0.4 to about 0.9 wt. percent of the final catalyst composition.

The catalyst composition of this invention is prepared by impregnating the described alumina with germanium dioxide and a platinum group metal compound. The platinum group metal compound will, upon subsequent heat treatment at oxidation conditions followed by heat treatment at reducing conditions hereinafter described, be reduced to a platinum group metal while the germanium component will be retained as the oxide. The germanium dioxide and the platinum group metal are incorporated in the catalyst composition by impregnating techniques from a common impregnating solution. Thus, germanium dioxide is prepared in aqueous solution, the concentration thereof being sufficient to insure a final catalyst composition comprising from about 0.5 to about 1.0 wt. percent germanium dioxide. The germanium dioxide employed herein is preferably substantially in the soluble or hexagonal form. Suitable solubility of the germanium dioxide in the platinum group metal compound-germanium dioxide impregnating solution is achieved by initially preparing the germanium dioxide in aqueous solution at a temperature of at least about 160° F., and preferably at a temperature of from about 180° to about 210° F., and thereafter commingling a soluble platinum group metal compound therewith. When the germanium dioxide and platinum group metal are commingled in water and subsequently heated, the desired degree of solubility for impregnating purposes has not been observed. While platinum group metals include platinum, palladium, rhodium, ruthenium, osmium, and iridium, platinum is a preferred catalyst component. Suitable platinum group metal compounds include platinum chloride, chloroplatinic acid, ammonium chloroplatinate, dinitrodiamino platinum, palladium chloride, chloropalladic acid, and the like. The utilization of a platinum group metal in combination with halogen, such as chloroplatinic acid, is preferred as it facilitates the incorporation of both the platinum group metal and at least a portion of the halogen component in the catalyst composition. Hydrochloric acid is also generally added to the impregnating solution in order to further facilitate the incorporation of the halogen component in the catalyst composition. In any case, the concentration of the platinum group metal compound in the impregnating solution is sufficient to insure a final catalyst composition comprising from about 0.1 to about 1.0 wt. percent platinum group metal. The impregnating solution is preferably filtered while not to separate insoluble materials therefrom. The impregnating solution is prepared in a sufficiently diluted state to provide a supernatant layer over the alumina carrier material at quiescent aging conditions whereby the alumina particles are uniformly contacted with the impregnating solution to effect an optimum dispersion of the catalytic components on the alumina carrier material. Preferably, the carrier material is maintained in contact with the impregnating solution at quiescent conditions for a period of at least about 15 minutes prior to evaporating the solution to dryness. The catalyst composition is suitably dried in the described manner to contain about 30 wt. percent volatile matter. The catalyst is thereafter calcined at a temperature of from about 800° to about 1100° F. in an oxidizing atmosphere for a period of from about 0.5 to about 10 hours in order to convert the metallic components substantially to the oxide form. Best results are generally obtained when the halogen content of the catalyst is adjusted during the calcination step by including a halogen or a halogen-containing compound in the oxidizing atmosphere. In particular, when the halogen component of the catalyst is chlorine, it is preferred to use $H_2O$ and HCl in the oxidizing atmosphere in a mole ratio of from about 20:1 to about 100:1 during at least a portion of the calcination step to adjust the final chlorine content of the catalyst in the range of from about 0.4 to about 0.9 wt. percent.

It is preferred that the resultant calcined catalytic composite be subjected to a substantially water-free reduction step prior to its use in the conversion of hydrocarbons. This step is designed to insure a uniform and finely divided dispersion of the metallic components throughout the carrier material. Preferably, substantially pure and dry (i.e., less than 20 vol. p.p.m. $H_2O$) hydrogen is used as the reducing agent in this step. The reducing agent is contacted with the calcined catalyst at conditions, including a temperature of from about 700° to about 1100° F., selected to reduce the platinum group metal component to the metallic state while maintaining the germanium component in an oxidized state. This reduction step may be performed in situ as part of a start-up sequence if precautions are taken to pre-dry the plant to a substantially water-free state, and if substantially water-free hydrogen is used. In order to minimize the danger of reducing the germanium component during this step, the duration of the step is preferably less than about 2 hours, and more typically, about 1 hour.

Although it is not essential, the resulting reduced catalyst composition may, in some cases, be beneficially subjected to a presulfiding operation designed to incorporate in the catalyst composition from about 0.05 to about 0.50 wt. percent sulfur calculated on an elemental basis. Preferably, this presulfiding treatment is in the presence of hydrogen and a suitable sulfur-containing compound such as hydrogen sulfide, lower molecular weight mercaptans, organic sulfides, etc. Typically, this procedure comprises treating the reduced catalyst with a sulfiding gas such as a mixture of hydrogen and hydrogen sulfide having about 10 miles of hydrogen per mole of hydrogen sulfide at conditions to effect the desired incorporation of sulfur, generally including a temperature of from about 50 to about 1115° F. or more.

The present invention further embodies a process for reforming a gasoline fraction which process comprises contacting said gasoline fraction, in admixture with hydrogen, with the catalyst composition of this invention at reforming conditions. The gasoline fraction employed as a charge stock comprises petroleum hydrocarbon fractions that boil in the gasoline range and contain aromatics and paraffins. The preferred charge stocks are those consisting predominantly of aromatics, naphthenes, and paraffins, although minor amounts of olefins may be present. This preferred class includes straight-run gasoline, natural gasoline, and the like. The gasoline fraction may be a full boiling range gasoline having an initial boiling point of from about 50 to about 105° F. and an end boiling point of from about 285° to about 430° F., or it may be a selected fratcion thereof which usually is a higher boiling fraction commonly referred to as naphtha and having an initial boiling point of from about 150 to about 250° F. and an end boiling point of from about 345° to about 430° F. Mixtures of the various gasoline and/or gasoline fractions may also be used, and thermally and/or catalytically cracked gasolines may also be used as charge stock. However, when these unsaturated gasoline fractions are used, it is preferred that they be used in admixture with a straight-run or natural gasoline fraction, or hydrogenated before use in the process.

Reforming conditions herein contemplated include an imposed pressure of from about 50 to about 1000 p.s.i.g. or more, preferably from about 100 to about 600 p.s.i.g., and an elevated temperature of from about 795 to about 1065° F. A hydrogen-rich gas, principally a recycle gas comprising an excess of about 80% hydrogen, is admixed with the selected hydrocarbon charge stock to provide a hydrogen/hydrocarbon mole ratio of from about 2 to about 20. The hydrocarbon charge stock in admixture with hydrogen is generally pre-heated to the desired reaction temperature and passed into contact with the catalyst contained in the reaction zone. The hydrocarbon charge stock is passed in contact with the catalyst at a liquid hourly space velocity (LHSV), defined as the volume of liquid hydrocarbon charge per hour per volume of catalyst contained in the reaction zone, and from about 0.5 to about 10, a LHSV of from about 1.0 to about 4.0 generally being preferred. The reaction zone effluent is recovered in a high pressure-low temperature receiver whereby a hydrogen-rich gaseous phase is separated and recycled, in part, to the reaction zone in admixture with the hydrocarbon charge thereto.

The catalyst composition of this invention is advantageously employed in a substantially water-free environment. It is therefore desirable to maintain the water content of the hydrocarbon charge stock at less than about 20 p.p.m. It is further desirable to dry the hydrogen stream so as to contain less than about 10 p.p.m. water. In view of the valuable catalyst composition involved, it is preferred to effect the reforming operation in a fixed bed catalyst system to obviate attrition losses otherwise incurred. However, other systems including the moving bed and fluidized bed systems may be employed.

Although the catalyst composition of this invention is most suitable for reforming, it may be used to promote other reactions including the hydrogenation of specific hydrocarbons or hydrocarbon fractions, isomerization of specific hydrocarbons or hydrocarbon fractions, destructive hydrogenation or hydrocracking of larger hydrocarbon molecules such as those occuring in the kerosine and gas oil boiling range, and the oxidation of hydrocarbons to produce first, second, and third stage oxidation products. Reaction conditions employed in the various hydrocarbon conversion reactions are those heretofore practiced in the art. For example, alkylaromatic isomerization reaction conditions include a temperature of from about 32° to about 1000° F., a pressure of from about atmospheric to about 1500 p.s.i.g., a hydrogen to hydrocarbon mole of from about 0.5:1 to about 20:1, and a LHSV of from about 0.5 to about 20. Like-wise, typical hydrocracking reaction conditions include a pressure of from about 500 p.s.i.g. to about 3000 p.s.i.g., a temperature of from about 390° to about 935° F., a LHSV of from about 0.1 to about 10, and a hydrogen circulation rate of from about 1000 to about 10,000 s.c.f./bbl. (standard cubic feet per barrel of charge).

The following example is presented in illustration of one embodiment of this invention and is not intended as an undue limitation on the generally broad scope of the invention as set out in the appended claims.

EAMPLE I

Gamma-alumina spheres of about 1/16" diameter and containing about 0.3 wt. percent combined chloride were prepared by the described oil-drop method. Thus, an aluminum chloride hydrosol, formed by digesting aluminum in dilute hydrochloric acid, was commingled with hexamethylenetetramine and dispersed as droplets in a hot oil bath. The resulting spheres were aged in the oil bath overnight, water-washed, dried and calcined in air at 1000° F. for about 4 hours. The spheroidal aluminum particles had an ABD of 0.52 gram per cubic centimeter, a surface area of about 200 square meters per gram and an average pore volume of about 0.35 cubic centimeters per gram.

An impregnating solution was prepared by dissolving 1.26 grams of germanium dioxide in 250 cubic centimeters of water at 165° F., an adding thereto 6.7 milliliters of chloroplatinic acid, the chloroplatinic acid containing 97.8 milligrams of platinum per milliliter. About 8.4 milliliters of concentrated hydrochloric acid was thereafter added to the rapidly stirred solution. Heating of the stirred solution was continued at about 165° F. for 15 minutes, and the solution was thereafter filtered hot. The hot filtrate was charged to an impregnator and 350 cubic centimeters of the spheroidal alumina was immersed therein and maintained in contact with the hot solution for about ½ hour at quiescent conditions. The solution was thereafter evaporated to dryness in contact with the alumina in a rotary steam evaporator. The impregnated product was recovered and air-dried for about 2 hours at 390° F. The dried product was then heated for about 2 hours at 975° F. in a dry air atmosphere containing about 0.9 mole of hydrochloric acid, and thereafter in dry air alone at said temperature for about ½ hour. After a 15 minute nitrogen purge, the catalyst composition was treated in a hydrogen atmosphere at a temperature of about 1050° F. for about 1 hour.

The catalyst thus prepared was evaluated in a laboratory scale reforming plant comprising a reactor containing the catalyst, a hydrogen separator and a debutanizer column. In this plant, a hydrogen-rich recycle stream and the charge stock are commingled and heated to the desired temperature. The charge stock was a heavy Kuwait naphtha characterized by an API gravity at 60° F. of 60.4, an F–1 clear octane rating of 40.0, and a 185–360° F. boiling range. The hydrogen-hydrocarbon mixture is passed downflow through the reactor containing the catalyst disposed in a fixed bed. The effluent stream is then withdrawn and passed to a high pressure-low temperature wherein a hydrogen-rich gaseous phase is separated from the liquid phase at a temperature of about 55° F. A portion of the gaseous phase is continuously passed through a high surface area sodium scrubber and the resulting substantially water-free hydrogen stream recycled to the reactor, and the excess over that needed for plant pressure is recovered as excess separator gas. The liquid phase is withdrawn from the separator and passed to the debutanizer column wherein light ends are taken overhead as a debutanizer gas, and a $C_5+$ reformate stream recovered as bottoms.

The stability characteristics of the catalyst were determined in a high severity reforming operation. The test consisted of 6 periods of 24 hours, each including a 12 hour line-out period followed by a 12 hour test period. The reforming conditions included a reactor pressure of 100 pounds per square inch, a hydrogen to hydrocarbon mole ratio of about 5:1, and a liquid hourly space velocity of 1.5. The reactor inlet temperature was periodically adjusted in order to achieve and maintain a $C_5+$ reformate target octane of 102, F-1 clear. The test results are tabulated below in terms of temperature required to make octane, $C_5+$ yield, and debutanizer and separator gas make.

| Period No. | T., °F. | $C_5+$, vol. percent | Separator gas, s.c.f./bbl. | Debutanizer gas, s.c.f./bbl. |
| --- | --- | --- | --- | --- |
| 1 | 963 | 79.0 | 1,753 | 59 |
| 2 | 972 | 77.7 | 1,791 | 63 |
| 3 | 984 | 77.7 | 1,786 | 61 |
| 4 | 989 | 78.8 | 1,757 | 61 |
| 5 | 995 | 76.6 | 1,739 | 67 |
| 6 | 1,003 | | 1,716 | 71 |

We claim as our invention:

1. A method of catalyst preparation which comprises combining halogen with an alumina gel carrier material; preparing germanium dioxide in aqueous solution at a temperature of at least about 160° F.; commingling a soluble platinum group metal compound with said solution; impregnating the aforesaid alumina gel with the resulting solution; treating the impregnated gel in an oxidizing atmosphere at a temperature of from about 800° to about 1100° F., and thereafter in a reducing atmosphere at conditions effecting the reduction of the platinum group metal component, said conditions including a temperature of from about 700° to about 1100° F. whereby the germanium dioxide component is retained as the oxide.

2. The method of claim 1 further characterized in that said alumina gel is precipitated from an aluminum halide sol.

3. The method of claim 1 further characterized in that said germanium dioxide is prepared in aqueous solution at a temperature of from about 180° to about 210° F.

4. The method of claim 1 further characterized in that said alumina gel is subjected to a quiescent aging in said platinum group metal compound-germanium dioxide solution for a period of at least about 15 minutes and thereafter evaporating said solution to dryness.

5. The method of claim 1 further characterized in that said platinum group metal compound is a compound of platinum.

6. The method of claim 1 further characterized in that said platinum group metal compound is chloroplatinic acid.

7. The method of claim 1 further characterized in that said platinum group metal compound is employed in an amount to provide a final catalyst composition comprising from about 0.1 to about 1.0 wt. percent platinum group metal.

8. The method of claim 1 further characterized in that said germanium dioxide is employed in an amount to provide a final catalyst composition comprising from about 0.5 to about 1.0 wt. percent germanium dioxide calculated as the elemental metal.

9. The method of claim 1 further characterized in that said combined halogen is combined chlorine.

References Cited
UNITED STATES PATENTS

| | | | |
| --- | --- | --- | --- |
| 3,567,656 | 3/1971 | Mitsche | 208—138 X |
| 3,578,584 | 5/1971 | Hayes | 252—442 X |
| 2,606,878 | 8/1952 | Haensel | 252—442 |
| 3,058,907 | 10/1962 | Van Nordstrand et al. | 208—139 X |
| 2,906,700 | 9/1959 | Stine et al. | 252—466 PT X |

PATRICK P. GARVIN, Primary Examiner

U.S. Cl. X.R.

252—441; 208—138, 139; 252—439